235-380

OR 3,573,731 SR

United States

[11] 3,573,731

| [72] | Inventor | Fred N. Schwend |
| | | Arcadia, Calif. |
| [21] | Appl. No. | 737,488 |
| [22] | Filed | June 17, 1968 |
| [45] | Patented | Apr. 6, 1971 |
| [73] | Assignee | Clary Corporation |
| | | San Gabriel, Calif. |

[54] DEVICE FOR DETERMINING AUTHENTICITY OF A CREDIT CARD OR THE LIKE
8 Claims, 5 Drawing Figs.

| [52] | U.S. Cl. | 340/149, |
| | | 235/61.7, 235/61.11 |
| [51] | Int. Cl. | G06k 7/00, |
| | | H01h 43/08, H01h 9/00 |
| [50] | Field of Search | 340/149; |
| | | 235/61.7, 61.9, 61.11; 200/46 |

[56] References Cited
UNITED STATES PATENTS
3,262,124  7/1966  Albiani..................  235/61.7

*Primary Examiner*—Donald J. Yusko
*Attorney*—Fred N. Schwend

ABSTRACT: A device for insuring authenticity of a credit card or the like having holes therein representing by their positions and size a particular identification number, such as part of a credit card holder's account number, in which the card differentially sets slides to contact certain of a series of contacts connected in random coded manner to a second series of contacts. The latter contacts are selectively placed in electrical circuit with an authenticity indicating device by means of manually settable slides so that only when the latter slides are properly set in accordance with a coded number known only to the proper card holder, will a complete circuit be made to the indicating device.

PATENTED APR 6 1971
3,573,731
SHEET 1 OF 2
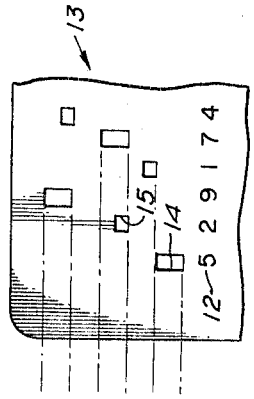
FIG_5_
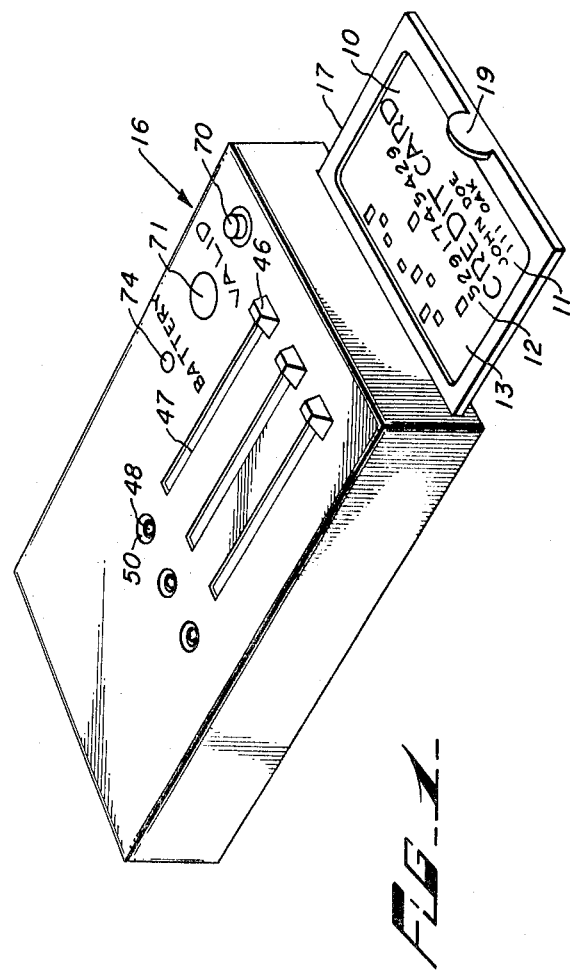
FIG_1_
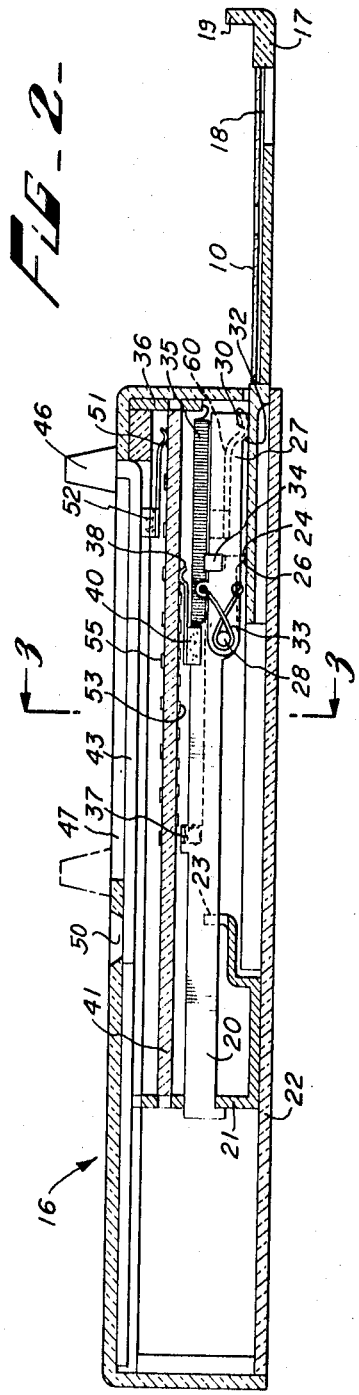
FIG_2_
INVENTOR.
FRED N. SCHWEND

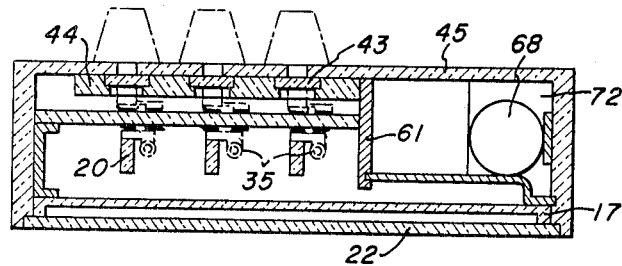
FIG_3_
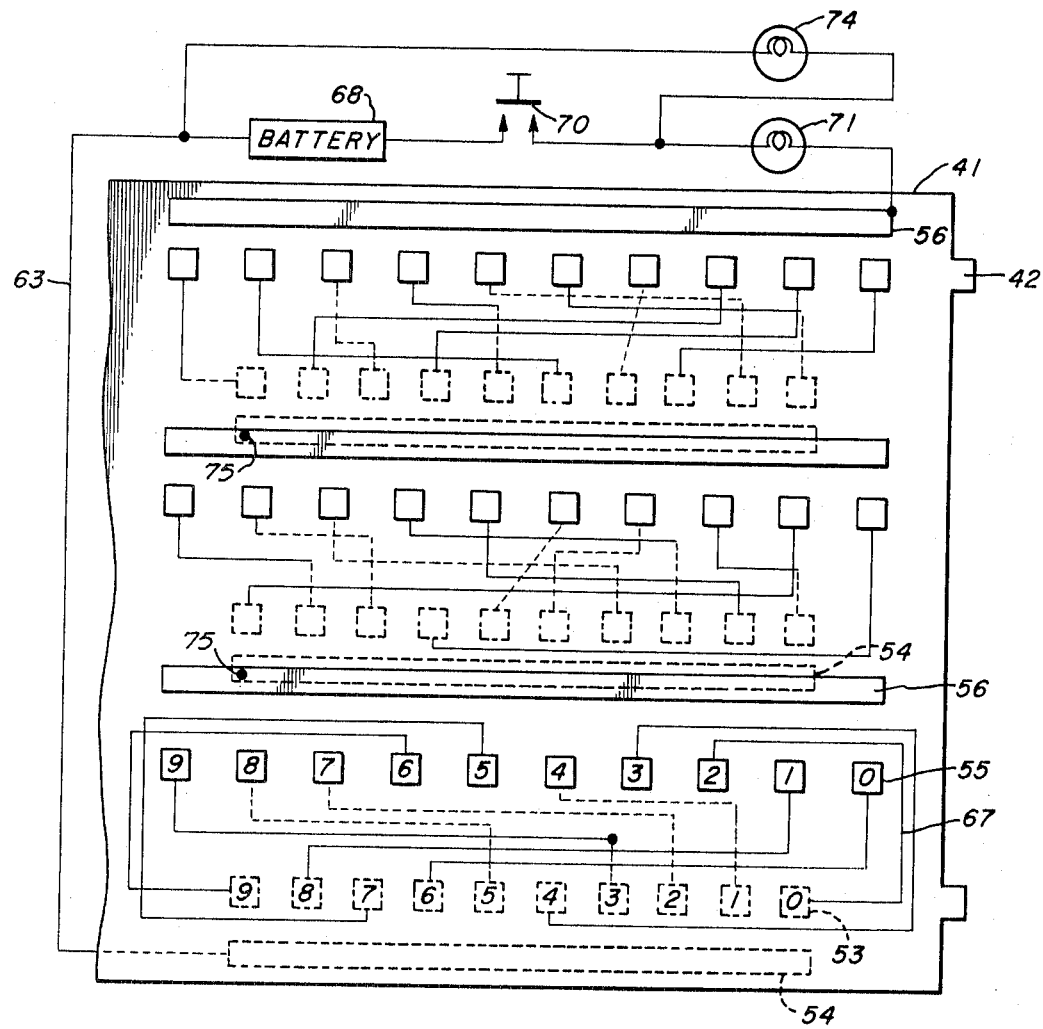
FIG_4_
INVENTOR.
FRED N. SCHWEND

DEVICE FOR DETERMINING AUTHENTICITY OF A CREDIT CARD OR THE LIKE

The present invention relates to devices for verifying the ownership of credit cards, tokens, etc., and has particular reference to a device for indicating when the cardholder is the proper owner of the card.

The use of credit cards to authorize purchases of items, services, etc., on credit has become widespread in the last several years and presents the distinct advantage that it eliminates the need for the card owner to carry large sums of money on his person in order to make purchases. However, lost or stolen credit cards present a problem because of the ease in which they may be used by unauthorized persons to make unwarranted purchases, the cost of such purchases being charged to the account of the true owner of the card.

A principal object of the present invention is to provide a relatively simple and economical device for determining if a person presenting a credit card is the true owner thereof.

Another object is to provide a device of the above type which is self-contained and portable.

The manner in which the above and other objects of the invention are accomplished will be readily understood on reference to the following specification when read in conjunction with the accompanying drawings, wherein:

FIG. 1 is a perspective view of a device embodying a preferred form of the present invention.

FIG. 2 is a longitudinal sectional view through the device.

FIG. 3 is a transverse sectional view through the device and is taken along the line 3—3 of FIG. 2.

FIG. 4 is a plan view of the printed circuit board, partly broken away, and showing the same schematically connected in circuit with battery and indicator lights.

FIG. 5 is a plan view of a portion of a credit card capable of being used with the device of the present invention.

Referring to the drawings, a credit card 10, typical of those which may be used with the device of the present invention, is preferably of a suitable plastic material on which the card owner's name and address 11 and account number 12 are embossed to permit printing of the same onto a suitable record sheet (not shown) through a carbon paper or ribbon. The credit card also has a field of control holes 13 therein which may represent the account number 12. Such holes are located in various denominationally arranged vertical columns and in any of five horizontal rows, depending upon the digital representations of the holes. It will be noted that the holes are rectangular and of two different sizes, the larger sizes, i.e. 14, representing by their positions in different ones of the horizontal rows, the digits 5 to 9, counting from the bottom row, and the smaller size perforations, i.e. 15, representing by their positions in the different horizontal rows, the digits 0 to 4, also counting from the bottom row. Only one hole is provided for each column. Such arrangement permits the size of the field 13 to be restricted to a small portion of the credit card, leaving room for such other indicia as the card owner's name, address, account number, etc.

As shown in the drawings, the device comprises a housing 16 having an opening at its forward end in which is slideably mounted a tray 17 having a recessed portion 18 to receive a suitable credit card 10. By grasping a tab 19, the tray may be slid from an outer position, shown in FIGS. 1 and 2, wherein the credit card may be removed or replaced, to an inserted position within the housing. A spring finger 60 is attached to a central portion 61 of the housing and acts to hold the credit card flat against the bottom of the recess 18 when the tray is moved into its inserted position.

A series of slides 20 are provided in the housing and are slideably mounted in slots formed in a bracket 21 which is suitably secured to the bottom wall 22 of the housing and which extends forwardly to form a guiding comb 23 for guiding the slides 20 against lateral movement. The slots in the bracket permit a slight vertical rocking movement of the slides.

The forward ends of the slides terminate in sensing noses 24 adapted to drop into the small holes, i.e. 15, in the credit card. Each such sensing nose has a vertical forward face and an inclined rear face 26. An advance sensing lever 27 is pivoted to each slide at 28 and is provided with a sensing nose 30 having a relatively wide bottom edge adapted to drop into a larger hole, i.e. 14, only in the credit card. Each sensing nose 30 has an inclined rear edge 32. A light torsion spring 33 urges the lever 27 downwardly to lightly ride against the upper surface of the tray 17 and the credit card carried thereby. A guide ear 34 is formed from each slide 20 and extends over the associated lever 27 to guide the latter against lateral movement. A tension spring 35 extends between a crosspiece 36 in the housing and an ear 37 on each slide to normally hold the slide in its illustrated position shown in FIG. 2.

Flexible contact brushes 38 are carried by the slides 20 through insulating blocks 40 of plastic or the like and such brushes extend into wiping contact with the bottom surface of a printed circuit board 41 of plastic or similar insulating material. The brushes also yieldable urge the forward ends of the slides 20, causing the sensing noses 24 to ride on the surface of the tray 17 and the card 10.

As shown in FIGS. 2 and 4, the board 41 is provided with tabs 42 at opposite ends which fit in holes in the crosspiece 36 and bracket 21 to hold the board in a horizontal position.

A set of slides 43 are slideably mounted in a guide plate 44 suitably attached to the upper wall 45 of the housing and each has a manually operable knob 46 thereon extending through a slot 47 in the upper wall. Each slide has a series of indicia 48 ranging in value from zero to 9 and visible, one at a time, through a window 50 in the upper wall to indicate the numerical position to which the slide 43 is set. A flexible contact brush 51 is attached to each slide 43 through a block of insulating material 52.

The brush 38 carried by each slide 20 is arranged to wipe over a row of ten contacts 53 on the underside of the board 41 and is also in continual wiping engagement with a contact strip 54. Likewise, each of the upper brushes 51 is arranged to wipe over a row of 10 contacts 55 on the upper side of the board and is also in continual wiping engagement with a contact strip 56. The upper contact strip 56 of each set is electrically connected to the lower strip 54 of the succeeding set of sections at 75.

The upper contacts 55 in each set are connected to the lower contacts of the same set through conductors 67 in a random manner or according to a random code and such code is preferably different for the three different sets of contacts. For example, in the set associated with the highermost denominational order, i.e., the lowest set in FIG. 4, the upper 0 contact 55 (counting from the right) is connected with the lower 6 contact 53. Likewise, the upper 1 contact 55 is connected to the lower 8 contact.

The lower contact strip 54 in the highermost denominational order set of contacts is connected in series circuit with a battery 68 through a line 63, pushbutton switch 70, VALID lamp 71, and the upper contact strip 56 for the lowermost denominational set of contacts.

The lamp 71 and switch 70 are mounted on the housing, and the battery 68 is mounted within a chamber 72 formed in the housing, the battery being accessible through a removable closure (not shown) at one end of the housing.

As noted heretofore, the field of holes 13 in the credit card 10 may represent the card owner's account and may be used to automatically control the input of an accounting machine or the like. Such a machine is shown in the H. L. Clary pending patent application Ser. No. 729,444, filed May 16, 1968. In such case, any of such holes may be used to control the differential positioning of the slides 20, depending on the lateral location of said slides relative to the card 10. However, in cases where it is not desirable to perforate the card in accordance with the account number, three holes of the type similar to those shown at 14 and 15 may be formed and arranged so that they will be aligned with respective ones of slides 20 and located either at random or to represent any selected three-digit number.

Describing now the operation of the device, the card owner is furnished with a coded three-digit number which he commits to memory or carries in his possession apart from the card. Such number is related in accordance with a particular wiring configuration which is hidden from view and therefore the relation between the number and the number represented by the holes cannot be determined by studying the card only. Accordingly, when the cardholder gives the card to the clerk, he also mentions the three-digit coded number which the clerk sets up on the slides 43. The clerk then places the card on the tray 17 and moves the latter fully into its inserted position whereupon the sensing noses 24 or 30 fall into the aligned holes in the card to differentially advance the slides. If the three-digit number given by the cardholder is proper, a circuit will be completed to the switch 70 and when the clerk presses the latter, the VALID lamp will be lit, otherwise it will not be lit.

A second BATTERY lamp 74 is provided in series circuit with the battery 68 and switch 70 so it will light up whenever the switch 70 is closed and the battery is in working order. If the BATTERY lamp is lit but the VALID lamp is not, the clerk is apprised of the fact that the cardholder has not given the proper coded number and should be assumed to be unauthorized to receive credit.

Upon withdrawal of the credit card from the housing, the sensing noses 24 and 30 will be cammed out of the respective holes in the card and the springs 35 will return the slides 20 to their initial positions.

The coded three-digit number is determined by the particular circuit arrangement presented on the board 41.

I claim:

1. A device for determining authenticity of credit cards or the like having character representing means located in different positions to represent different characters, respectively, which comprises:
   a slide;
   means for guiding a said card along said slide to a predetermined position;
   said slide having sensing means thereon for causing said slide to move with said card from an initial position upon sensing a said character representing means;
   a first row of contacts;
   brush means carried by said slide and engageable with successive ones of said contacts;
   a second row of contacts;
   means connecting the contacts of said first row to the contacts of said second row according to a predetermined code;
   a second manually operable slide;
   second brush means carried by said second slide and engageable with successive ones of said last mentioned contacts;
   means forming a set of indicia indicative of numerical positions to which said second slide is movable;
   said indicia being related to said different characters represented by said character representing means in accordance with said code; and
   electrically operated authenticity indicating means connected in circuit with said brushes.

2. A device according to claim 1 wherein said character representing means comprises an opening in said card and wherein said sensing means comprises a nosepiece adapted to enter said opening.

3. A device according to claim 1 wherein said guide means comprises:
   a tray for receiving said card; and
   means for guiding said tray to carry said card into cooperative relation with said sensing means.

4. A device according to claim 1 comprising spring means for returning said slide to said initial position.

5. A device for determining authenticity of credit cards or the like having character representing means located in different positions to represent different characters, respectively, which comprises:
   a plurality of independently movable slides;
   means for guiding a said card along said slides to a predetermined position, each of said slides havingسensing means thereon for causing said slide to move with said card upon sensing a said character representing means;
   a plurality of sets of first and second rows of contacts;
   first brush means carried by said slides and engageable with successive ones of the contacts of respective ones of said first rows;
   means connecting the contacts of said first row in each of said sets to the contacts of said second row in the same said set according to a predetermined code;
   second manually operable slides movable along respective ones of said second rows of contacts;
   second brush means carried by said second slides and engageable with successive ones of said last mentioned contacts;
   said second brush means connecting said contacts of said second row in a respective set except the last set to the first brush means of a succeeding set;
   means forming sets of indicia indicative of numerical positions to which said second slides are movable;
   said indicia being related to said different characters represented by said character representing means in accordance with said code; and
   an electrically operated authenticity indicating means connected in circuit with the first brush means associated with the first said set and the second brush means associated with the last said set.

6. A device according to claim 5 wherein said connecting means connects the contacts of different ones of said sets in accordance with different predetermined codes.

7. A device for determining authenticity of credit cards or the like having physical formations thereon located in different positions to represent different characters, respectively, which comprises:
   a slide;
   means for guiding a said card along said slide to a predetermined position;
   said slide having sensing means thereon for causing said slide to move with said card from an initial position upon sensing a said formation;
   a row of contacts;
   brush means carried by said slide and engageable with successive ones of said contacts;
   a plurality of circuits connected to said contacts in accordance with a predetermined code;
   a set of indicia related to said different characters represented by said formations in accordance with said code;
   electrically operated authenticity indicating means; and
   manual means for selectively connecting said authenticity indicating means in circuit with a selected one of said circuit and with said brush means.

8. A device for determining authenticity of credit cards or the like having openings located in different positions to represent different characters, respectively, which comprises:
   a housing;
   a plurality of slides movable endwise in said housing;
   spring means normally maintaining said slides in initial positions;
   a tray for receiving a said card;
   means for guiding said tray to carry said card from a first position outside said housing to a second position inside said housing;
   sensing elements carried by said slides and engageable with said openings upon movement of said card toward said second position whereby to differentially advance said slides from said initial positions;
   a circuit carrying member in said housing above said slides;
   sets of contacts on the upper and lower surfaces of said member;
   each of said sets of contacts comprising a first row of contacts on said lower surface and a second row of contacts on said upper surface and means connecting the contacts of said first row in each of said sets to the contacts of said second row in the same said set according to a predetermined code;

contact brushes carried by said slides and engageable with successive one of the contacts of respective ones of said first rows;

second manually operable slides in said housing above said circuit carrying member and movable along respective ones of said second rows of contacts;

second contact brushes carried by said second slides and engageable with successive ones of said last mentioned contacts;

means including said second contact brushes connecting said contacts of said second row in the respective set except the last set to said first contact brush of the succeeding set;

means forming sets of indicia indicative of numerical positions to which said second slides are movable; and an electrically operated authenticity indicating means connected in circuit with the first contact brush associated with the first said set and the second brush associated with the last said set.